United States Patent [19]

Rostoker et al.

[11] Patent Number: 5,761,516
[45] Date of Patent: Jun. 2, 1998

[54] SINGLE CHIP MULTIPROCESSOR ARCHITECTURE WITH INTERNAL TASK SWITCHING SYNCHRONIZATION BUS

[75] Inventors: Michael D. Rostoker, Boulder Creek; Douglas B. Boyle, Palo Alto, both of Calif.

[73] Assignee: LSI Logic Corporation, Milpitas, Calif.

[21] Appl. No.: 643,263

[22] Filed: May 3, 1996

[51] Int. Cl.$^6$ ............................................ G06F 13/00
[52] U.S. Cl. ............... 395/733; 395/200.31; 395/200.35; 395/200.78; 395/670; 395/675; 395/676
[58] Field of Search .................. 395/733, 200.01, 395/881, 200.31, 200.35, 200.78, 670, 673, 674, 675, 676, 553

[56] References Cited

U.S. PATENT DOCUMENTS

4,698,753 10/1987 Hubbins et al. .
5,040,109 8/1991 Bowhill et al. .
5,530,946 6/1996 Bouvier et al. ............... 395/182.21

*Primary Examiner*—Jack B. Harvey
*Assistant Examiner*—Ario Etienne
*Attorney, Agent, or Firm*—Oppenheimer Wolff & Donnelly LLP

[57] ABSTRACT

A plurality of processors which can be the same or different are formed on a single integrated circuit chip together with a memory controller and an I/O controller, and are interconnected by a data transfer bus. The processors can have larger word lengths and operate at higher speeds than comparable single chip processors due to reduced latency and signal path lengths. The processors are further interconnected by a processor synchronization bus which enables one processor to cause another processor to perform a task by generating an interrupt and passing the required parameters. The parameters can be passed via shared memory, or via a bidirectional data section of the processor synchronization bus. A processor running a large scale CAD or similar application can cause a smaller processor to perform I/O tasks in native code. A multiprocessor system can be configured as including a Single-Chip module (SCM), a Multi-Chip Module (MCM), Board-Level Product (BPL), or as a box-level product which includes a power supply.

27 Claims, 5 Drawing Sheets

SINGLE CHIP MULTIPROCESSOR ARCHITECTURE WITH INTERNAL TASK SWITCHING SYNCHRONIZATION BUS

BACKGROUND OF THE INVENTION

1. Field of the Invention

The present invention generally relates to the art of microelectronic integrated circuits, and more specifically to a single chip multiprocessor architecture with an internal task switching synchronization bus.

2. Description of the Related Art

Existing microprocessor dies or chips include only single processors. As silicon technology has improved and increased the number of transistors available on a single chip, the prevailing design philosophy has been to use the additional transistors to increase the performance of the single processor. This design philosophy has been followed to the point of diminishing returns.

Conventional multiprocessor systems include separate chips for the respective processors, a memory controller and an I/O controller. These chips are connected together by an interconnect (bus, crossbar switch, or similar method) on a printed circuit board (PCB).

Figure 1:
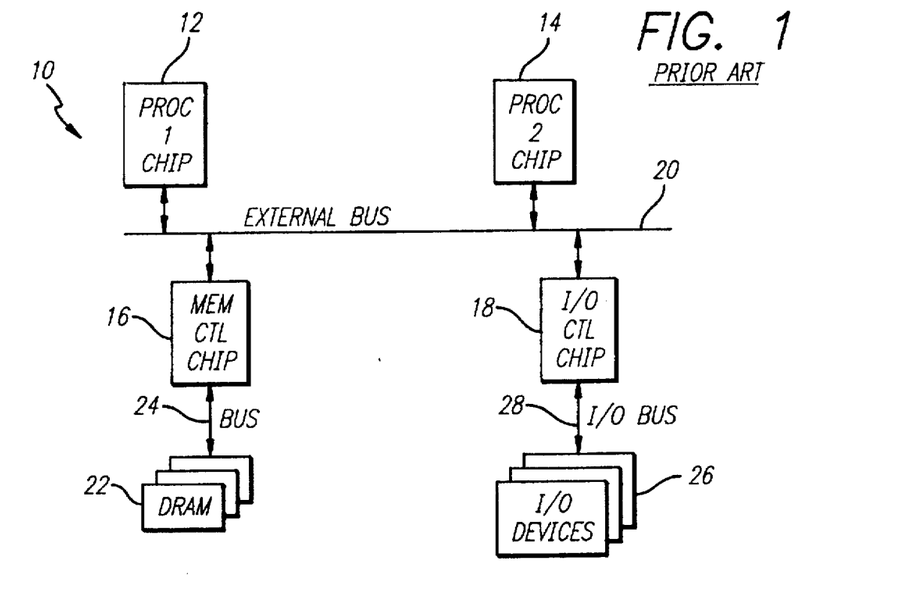
FIG. 1 is a diagram illustrating a conventional multiprocessor system.

A conventional multiprocessor system 10 is illustrated in FIG. 1, and comprises two processor chips 12 and 14 which are connected to a memory control chip 16 and an I/O control chip 18 by an external bus 20. The memory control chip 16 is connected to a DRAM memory system 22 via a DRAM bus 24, whereas the I/O control chip 18 is connected to input/output devices 26 such as a video monitor, disk drives, etc., via an I/O bus 28.

The components illustrated in FIG. 1 are provided as separate chips, and mounted on and interconnected to a motherboard or printed circuit board (PCB) which is not explicitly shown in the drawing using standard pins and sockets, flip-chip mounting, wirebond connections, etc. The components are interconnected on the PCB by a suitable metallization pattern.

The cost of chip pins and the physical limitations of PCB wires limit the datapath width and clock frequency of the interconnect. These limitations decrease the system performance by increasing the memory latency for each processor (in uniprocessor and multiprocessor applications), and the synchronization latency between processors (in multiprocessor applications). Much of the complexity of the current generation of processors is a result of techniques for mitigating the effects of this increased latency on performance.

Another problem which has remained unsolved in the prior art is how to run applications which require two very different types of tasks and processors. For example, a large scale computer aided design (CAD) system may require a 64 bit data bus to provide the necessary memory bandwidth, but must also perform disk access and other basic I/O operations using 16 bit words.

A large, preferably superscalar processor such as the Motorola PowerPC is required to service large scale CAD and other applications. However, the PowerPC must emulate 16 bit I/O and other operations, thereby substantially reducing the system operating speed whenever such an emulated operation must be performed.

SUMMARY OF THE INVENTION

The present invention provides a more cost-effective use of silicon real estate than has been possible in the prior art. In accordance with the invention, two or more smaller and simpler processors are combined on the same die, along with memory and I/O controllers. The on-chip interconnect can run at 2× to 4× faster clock speeds and have 2× to 4× wider datapaths.

The simpler processors can also be designed to run at higher clock speeds. The combination of multiple processors, higher clock speed and reduced interconnect latencies can provide much better price performance than conventional multichip designs.

More specifically, a multiprocessor system according to the present invention includes a plurality of processors which can be the same or different are formed on a single integrated circuit chip together with a memory controller and an I/O controller and interconnected by a data transfer bus. The processors can have larger word lengths than comparable single chip processors.

The processors are further interconnected by a processor synchronization bus which enables one processor to cause another processor to perform a task by generating an interrupt and passing the required parameters. The parameters can be passed via shared memory, or via a bidirectional data section of the processor synchronization bus.

A processor running a large scale CAD or similar application can cause a different processor to perform I/O tasks in native code. A multiprocessor system can be configured as including a Single-Chip module (SCM), a Multi-Chip Module (MCM), Board-Level Product (BPL), or as a box-level product which includes a power supply.

These and other features and advantages of the present invention will be apparent to those skilled in the art from the following detailed description, taken together with the accompanying drawings, in which like reference numerals refer to like parts.

DETAILED DESCRIPTION OF THE INVENTION

The present invention improves the performance of microprocessors or microcontrollers or other logic (herein called "microprocessors" such as: PowerPC, x86, MIPS, SPARC, 68000, SH-x, Alpha, HP-PA, i960, and TMS320Cx0) for applications in circuits and systems. Preferred embodiments of the invention are especially suited to x86 and PowerPC, yet the invention is broader than these embodiments. The present invention is also applicable to, for example, Computational MiniRISC (Worrell).

Figure 2:
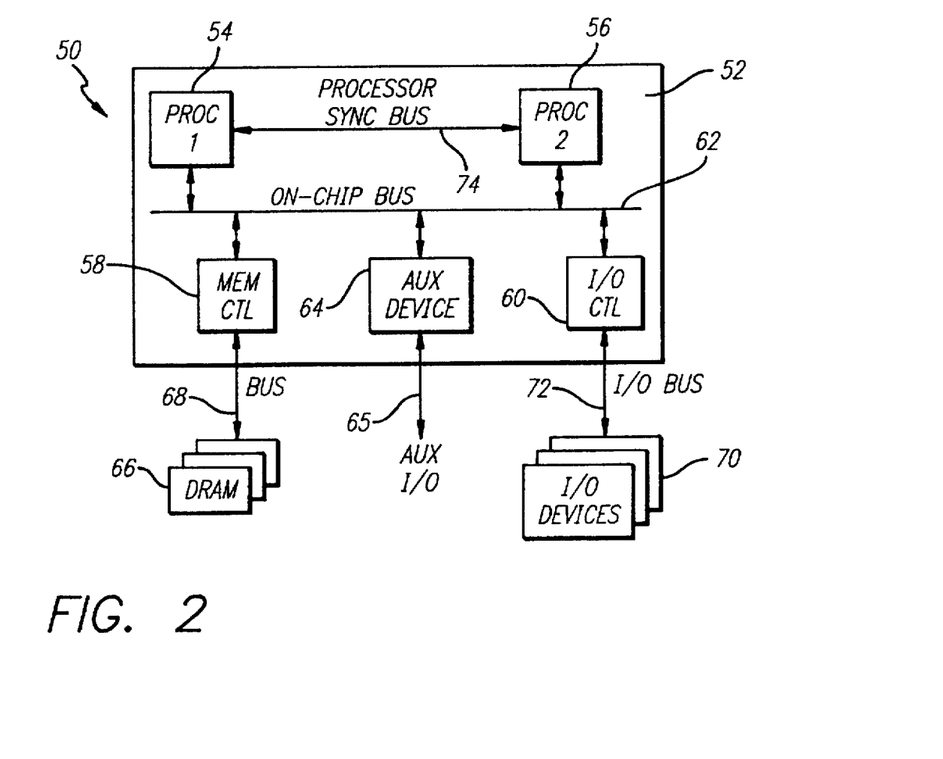
FIG. 2 is a diagram illustrating a multiprocessor system embodying the present invention.

A single-chip multiprocessor architecture according to the present invention is illustrated in FIG. 2. As viewed in the drawing, a Single-Chip Module (SCM) 50 includes an integrated circuit die or chip 52 on which are formed a first processor 54 and a second processor 56.

The first processor 54 can be a Motorola PowerPC 601 superscalar microprocessor, with the second processor 56 being an Intel X86 (386, 486, etc. microprocessor), although the invention is not limited to any particular combination of processors. Although only two processors 54 and 56 are shown in the drawing, it is fully within the scope of the invention to provide any suitable number of processors on the chip 52.

In addition to the processors, a DRAM memory control unit 58 and an Input/Output (I/O) control unit 60 are formed on the chip 52 and interconnected with the processors 54 and 56 by an on-chip address/data transfer bus 62. It is further within the scope of the invention to provide auxiliary or additional devices on the chip 52 and connect them to the bus 62 as indicated by a block 64 having an external I/O bus 65. Examples of such auxiliary devices include Motion Pictures Experts Group (MPEG) decoders and decryption units.

The memory control unit 58 is connected to an off-chip memory unit which is typically a Dynamic Random Access Memory (DRAM) by a bus 68. The I/O unit 60 is connected to input/output devices 70 such as a frame buffer, disk drives, etc via an I/O bus 72.

The processors 54 and 56 can be microprocessors, (separate microprocessors, microcontrollers, special purpose logic (i.e., Digital Signal Processing (DSP) processors), or general purpose logic capable of executing instruction sets (Multiprocessor units or MPU's). The multiple MPU's may be of the same type, of different types, or some combination of same, similar and different MPU's on one die or on one SCM or Multi-Chip Module (MCM) connected by a bus, crossbar, or other interconnect that supports cache-coherent multiprocessing protocols.

Although not explicitly illustrated, each processor or MPU has its own conventional cache system, which includes one or more levels of cache. The processors preferably share a cache controller, with Static Random Access Memory (SRAM) storage either on-chip or off-chip. The clock speed of each of the processors in the multiple microprocessor chip is higher than a conventional single microprocessor due to the simpler design and shorter wirelengths. This effect becomes more pronounced as the silicon technology continues to scale to smaller feature sizes.

One preferred embodiment of the invention uses 2 or more MPU's of the same architecture and design on the chip. For example, 2 Pentium Pro MPUs, connected by their cache-coherent multiprocessing bus. This embodiment is especially suitable for shared-memory multiprocessor applications.

Another preferred embodiment includes two or more MPUs with different architecture and different design on the chip. For example, a MIPS R4000 MPU and a SPARC MPU. This embodiment is especially suitable for applications that uses 64-bit MIPS scientific and graphics software and also require SPARC compatibility for EDA application software.

Another preferred embodiment includes two or more MPUs from different generations of the same architecture on the chip, for example a 386 MPU and a P7 MPU which are two different generations of the x86 architecture. This embodiment is especially suitable for applications which require high performance on recompiled 32-bit x86 software and HP-PA software, 64-bit software, and also require compatibility with x86 desktop productivity software.

Another preferred embodiment combines a CISC MPU and a RISC MPU on the chip.. For example, an Alpha 21164 MPU and a Pentium MPU on the chip. This embodiment is especially suitable for applications which require high performance on 64-bit scientific applications and also require high performance with x86 desktop productivity software. Another preferred embodiment includes an integrated Advanced Programmable Interrupt Controller (APIC) or similar device or function.

Yet another preferred embodiment combines a general purpose CISC or RISC MPU and a microcontroller (such as DSP, MPEG decoder, encryption/decryption engine, graphics rendering engine) on the chip. For example, an x86 MPU and a 3D graphics rendering engine provide the basis for a highly integrated PC or video game player.

The silicon technology used to implement the current generation of microprocessors is used in accordance with the present invention to build several simpler microprocessors on the same die. The aggregate performance of the group of microprocessors significantly exceeds the performance of a single complex microprocessor designed according to the prevailing design philosophy. The performance increase provided by the present invention can be exploited by server computers to increase throughput, and by parallel processing applications to speed up execution of a single task.

The single chip design also enables the on-chip bus to be substantially larger than for conventional single processor chips. For example, the bus 62 can be 256 bits wide, as compared to 64 bits for the standard PowerPC 601.

As discussed above, different applications can require very different types of tasks and processors. For example, a large scale computer aided design (CAD) system may require a 64 bit data bus to provide the necessary memory bandwidth, but must also perform disk access and other I/O operations using 16 bit words.

A large, preferably superscalar processor such as the Motorola PowerPC is required to service large scale CAD and other applications. However, the PowerPC must emulate 16 bit I/O operations, thereby substantially reducing the system operating speed whenever such an emulated operation must be performed.

In accordance with an important feature of the present invention, the activities of the processors 54 and 56 can be improved substantially by adding a processor synchronization bus 74. For example, one processor can enter a parallel section of code and want to have the other processor perform a subtask, rather than the one processor doing the subtask itself. The present invention provides a low latency and low overhead method to accomplish this goal, enabling the effective use of parallel processing on relatively short sections of parallel code.

An example of the present architecture and method as applied to two processors which are the same, or at least have compatible instruction sets, will be described with reference to FIGS. 3 to 6. It will be understood, however, that the present architecture is not so limited, and can be expanded to 3 or more processors which use the same or different instruction sets.

Figure 3:
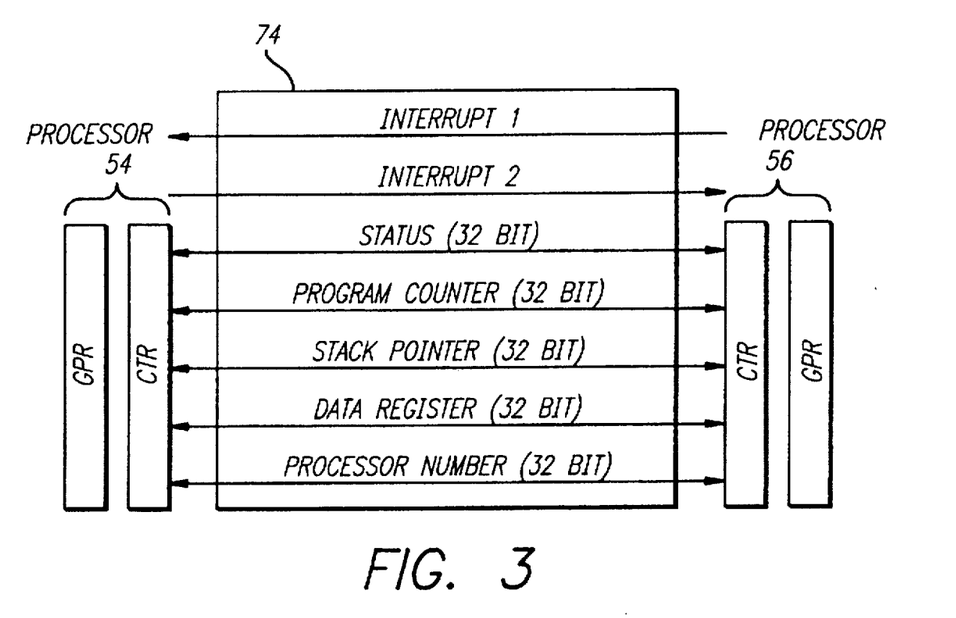
FIG. 3 is a diagram illustrating a processor synchronization bus of the system shown in FIG. 2.

An exemplary configuration of the processor synchronization bus 74 is illustrated in FIG. 3 as including an Interrupt 1 line for the processor 54 to interrupt the processor 56, and an Interrupt 2 line for the processor 56 to interrupt the processor 54.

Figure 4:
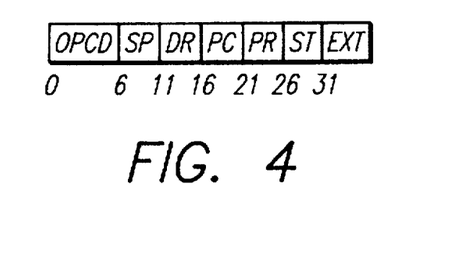
FIG. 4 is a diagram illustrating the format of a control transfer instruction in accordance with the invention.

The processors 54 and 56 interact with each other using a control transfer instruction CTRLT having an exemplary format as illustrated in FIG. 4. The CTRLT instruction is 32 bits long, and includes a 6 bit opcode (OPCD), a 5 bit stack pointer field (SP), a 5 bit data register (DR) field, a 5 bit program counter (PC) field, a 5 bit processor number field (PR), a 5 bit status (ST) field, and a 1 bit opcode extension (EXT) field.

The fields SP, DR, PC, ST and PR specify the numbers (addresses or other designations) of general purpose registers (GPRs), which hold the stack pointer, data, program counter and processor number to be stored. The processor number designates the processor 54 or 56 (or additional) processor which will be interrupted. The status register holds a numerical identifier of a special condition (if any).

The opcode extension EXT designates whether the command is a write command (CTRLTW) or a read command (CTRLTR). For example, the value of EXT for CTRLTW can be "1", whereas the value of EXT for CTRLTR can be "0".

The opcode OPCD is preferably selected from the list of auxiliary or reserved opcodes in the instruction set for the particular processor being used. For example, the opcode for the CTRLT instruction in the PowerPC instruction set is preferably "61".

The control transfer mechanism is symmetrical. Any processor can signal any other processor. A CTRLTW instruction writes or stores the values from the specified registers (GPRs) (SP, etc.) into the control transfer registers (CTRs) of the specified processor. If the control transfer registers for the specified processor are currently in use, execution of the CTRLTW instruction stalls until the registers are available. Execution of the CTRLTR instruction loads the specified registers (SP, etc.) from the control transfer registers, and marks the CTRs as available.

Figure 5:
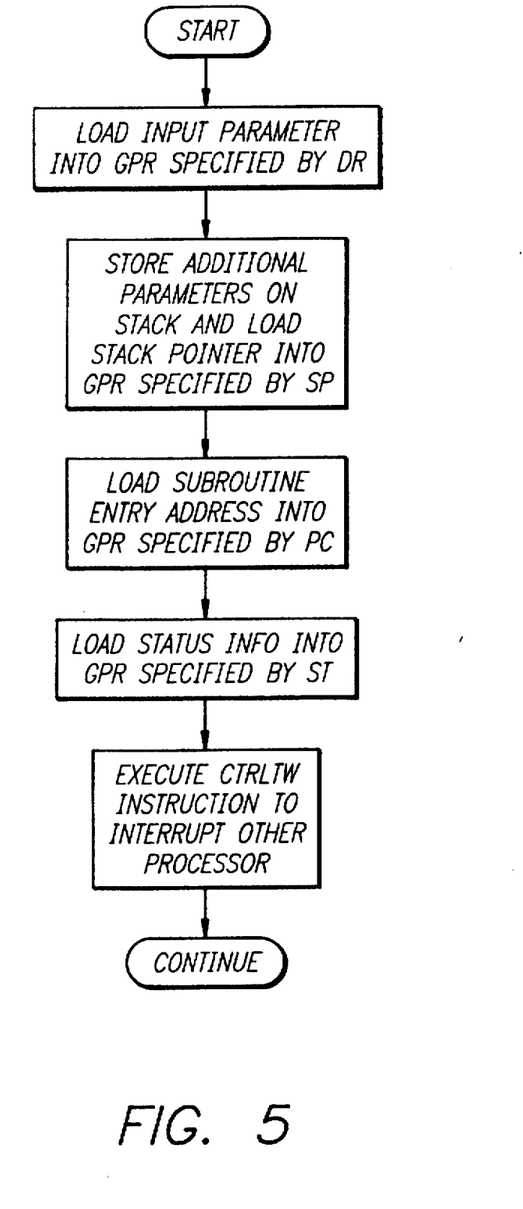
FIG. 5 is a flowchart illustrating the operation of transferring control from one processor to another, and receiving control back after the other processor has performed a designated operation.

The operation of one of the processors 54 and 56 causing the other of the processors 54 and 56 to perform a task is illustrated in the flowchart of FIG. 5.

It will be assumed that the processor 54 is running an application, and encounters code for a subtask which could be more advantageously performed by the processor 56. First, the processor 54 designates a general purpose register (GPR) and loads the main input parameter for the subtask (e.g. the opcode for a disk read or write operation) in this register. A number designating the GPR in which the parameter is stored (e.g. a register number or address) is specified as the field DR for the instruction CTRLTW.

Next, additional parameters for performing the subtask are stored on the register stack in the DRAM 66. The stack pointer indicating the first location of these parameters on the stack is loaded in a GPR, and the number of the GPR is specified as the field SP for the instruction CTRLTW.

The subtask is to be performed by the processor 56 as a subroutine. Therefore, the program counter value corresponding to an entry point to the subroutine is stored in a GPR, and the number of the GPR is specified as the field PC for the instruction CTRLTW.

Next, any status information relevant to the task is loaded in a GPR, and the number of the GPR is specified as the field ST for the instruction CTRLTW. The processor number is loaded in a GPR.

Then, the processor 54 executes the instruction CTRLTW with the fields specified as described above. The CTRs for the processor 56 are loaded with the values in the GPRs specified in the CTRLW instruction, except that the PR is loaded with the number for the processor 56. The CTRLTW instruction causes an interrupt to be applied to the processor 56 over the line Interrupt 1 of the processor synchronization bus 74. The processor 56 is thereby interrupted, and performs the subtask using the parameters specified in the fields of the instruction CTRLTW. The processor 54 continues to execute the main application in accordance with the program code.

Figure 6:
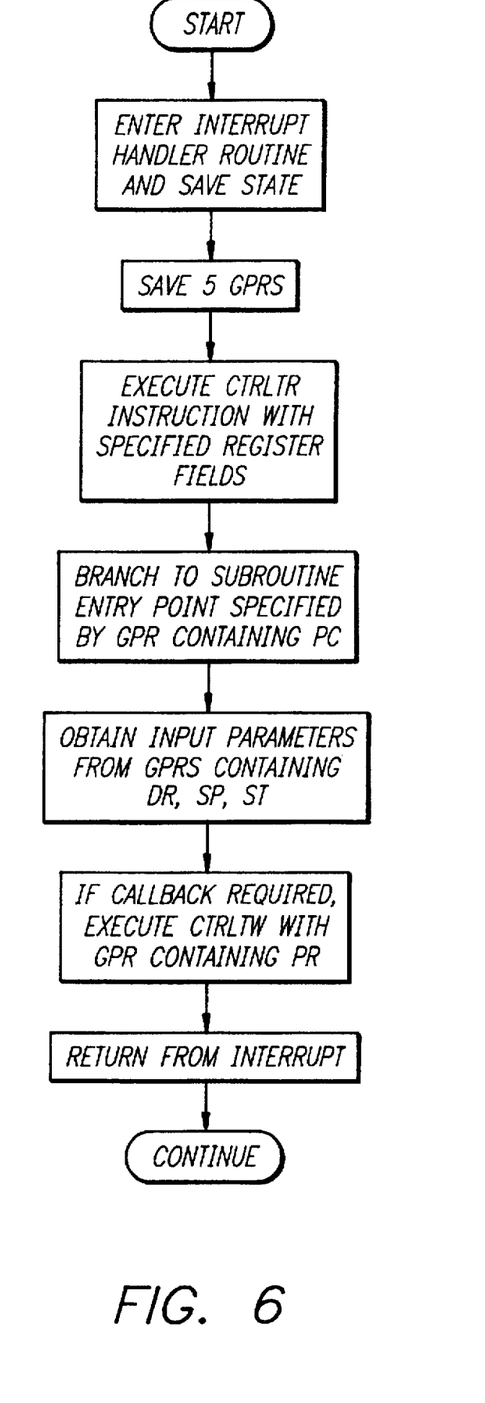
FIG. 6 is a flowchart illustrating the operation of a processor receiving control from another processor, and transferring control back after performing a designated operation.

The operation by which the processor 56 receives the interrupt and parameters in response to the processor 54 executing the CTRLTW instruction and performs the designated subtask is illustrated in FIG. 6.

Upon receipt of the interrupt from the processor synchronization bus 74, the processor 56 enters an interrupt handler routine and performs conventional steps to save its state to be restored upon return from interrupt. The processor 56 also saves 5 GPRs to hold the contents of the CTRs.

The processor 56 then executes the CTRLTR instruction, which includes reading the parameters for the subtask from the CTRS. The processor 56 then uses a standard instruction sequence to branch to the program counter address in the GPR specified by the PC field of the CTRLTR instruction to execute the subtask as a subroutine call, and returns to the interrupt handler routine.

If a callback is required, the processor 56 uses the contents of the GPR containing the PR field (the processor number of the processor 54) by executing a CTRLTW instruction with the processor 54 as the target. This interrupts the processor 54 and causes it to proceed based on the results of completion of the subtask (e.g. data read from disk). If a callback is not required, the processor 54 will get the results from shared memory (e.g. DRAM 66).

Finally, the processor 56 performs conventional steps of returning from interrupt, restoring its state and the 5 GPRS, and continuing processing. It will be noted that the operation of the processor 56 causing the processor 54 to perform a subtask is essentially the mirror image of that described above.

In an alternative embodiment of the invention, the bus 74 can further include a bidirectional 8 bit status (ST) section, a bidirectional 32 bit program counter (PC) section, a bidirectional 32 bit stack pointer (SP) section, and a bidirectional 32 bit data register (DR) section. In this case, the ST, PC, SP and DR fields are omitted from the CTRLT commands, and the bidirectional sections of the bus 74 are used to pass the corresponding parameters between the processors 54 and 56 rather than GPR control transfer registers.

Whereas the above description relates to an embodiment of the invention in which the processors 54 and 56 are the same or have compatible instruction sets, the invention is further applicable to an environment in which the processors 54 and 56 are different and/or use different instruction sets. Such a configuration includes the exemplary case of a CAD system in which the main graphics tasks are performed by a high performance PowerPC 64 bit processor, and simpler I/O tasks are conventionally performed in 16 bit emulation mode.

In this case, the processor 54 can be the PowerPC, and the processor 56 can be an x86. Both processors run in their native environment without emulation.

The main graphics program is run by the PowerPC processor 54. When an I/O instruction is encountered, the processor 54 interrupts the x86 processor 56 and transfers control to the processor 56 as described above. The processor 54 continues to perform graphics related tasks while the processor 56 performs the I/O instruction using native x86 code.

When the I/O task is completed, the processor 56 passes the relevant parameters back to the processor 54 via the shared memory. If a call-back is required, the processor 56 interrupts the processor 54 as described above.

Multiprocessor devices according to the present invention can be incorporated into system-level products. Such a system level product may specifically include a single chip module (SCM), often including other electrical components (such as capacitors); a multi-chip module (MCM) having 2 or more integrated circuits, with or without other electrical components; a board level product (BLP) such as those having multiple integrated circuits on a resin substrate board; and box level products or "Boxes" which may include a combination of elements from the list of: SCM, MCM, BLP or other devices. Boxes will generally also include a power supply.

Such system level products specifically include digital (or other memory storage systems); security systems; general purpose computers (such as personal computers, workstations, servers, minicomputers, mainframe computers, and supercomputers); and transportation vehicles (such as airplanes, trains, automobiles, helicopters, rockets, missiles, boats, submarines).

Other applications include subsystems for vehicles (such as positioning—i.e., GPS (Global Positioning System)—; display controllers, navigation, etc.)); entertainment systems (such as digital or other television, cameras, recorders, video games, compact disc players/recorders, FM, AM, tape or other audio systems); communication systems (such as traditional or cellular telephones, PBX, telephone switch, network controllers or encoder/decoders—such as token ring, Ethernet, ATM, etc.—hubs, routers, and switches for computer networks) and including subsystem or subassemblies for inclusion or attachment to such more complex system level products.

Figure 7:
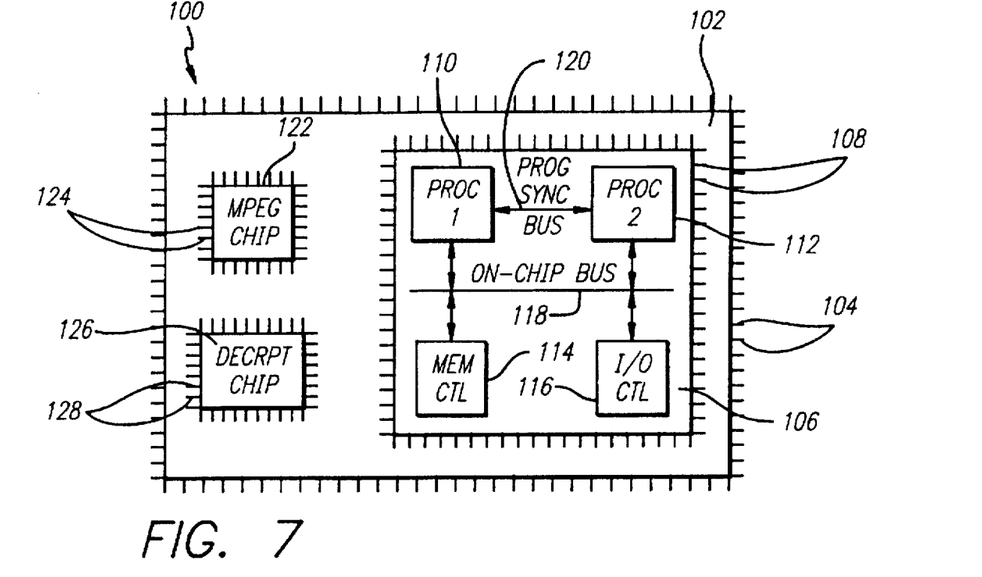
FIG. 7 is a plan view of a multi-chip-module (MCM) according to the present invention.

For example, whereas FIG. 2 illustrates an SCM embodiment of the present invention, FIG. 7 illustrates an MCM embodiment. An MCM 100 comprises a substrate 102 which has an interconnect metallization pattern (not shown) formed on one or more layers thereof. The MCM 100 further includes leads 104 for external interconnection which are connected to the metallization patterns on the substrate 102. The leads 104 may be in the form of wire-bonds, flip-chip bumps, pins, etc.

An SCM 106 which corresponds to the single chip multiprocessor illustrated in FIG. 2 is mounted on and electrically connected to the metallization pattern on the substrate 102 by leads 108 which may be wire-bonds, flip-chip bumps, pins which fit into conjugate sockets on the substrate 102, etc. The SCM 106 includes first and second processors 110 and 112, a memory control unit 114, and an I/O control unit 116 which are integrated onto the SCM 106 as described above. The components of the SCM 106 are interconnected by an on-chip bus 118, whereas the processors 110 and 112 are further interconnected by a processor synchronization bus 120 as described above.

Various other chips are mounted on the substrate 102 and interconnected to the SCM 106 via the metallization pattern on the substrate 102. As shown in the drawing, these chips include a motion-picture-experts-group (MPEG) audio/video decoder chip 122 having mounting leads 124, and a decryption chip 126 having leads 128.

The decryption chip 126 is typically utilized with the MPEG chip 122 to decrypt "scrambled" video and/or audio data which is encrypted to prevent access to unauthorized persons. Such an application is especially suited to consumer television signal distribution systems using cable or satellite networks.

It will be understood that an MCM embodying the present invention is not limited to the configuration illustrated in FIG. 7. The invention can include any other suitable types of processors integrated onto a single chip in combination with other chips or modules as required by a particular application.

Figure 8:
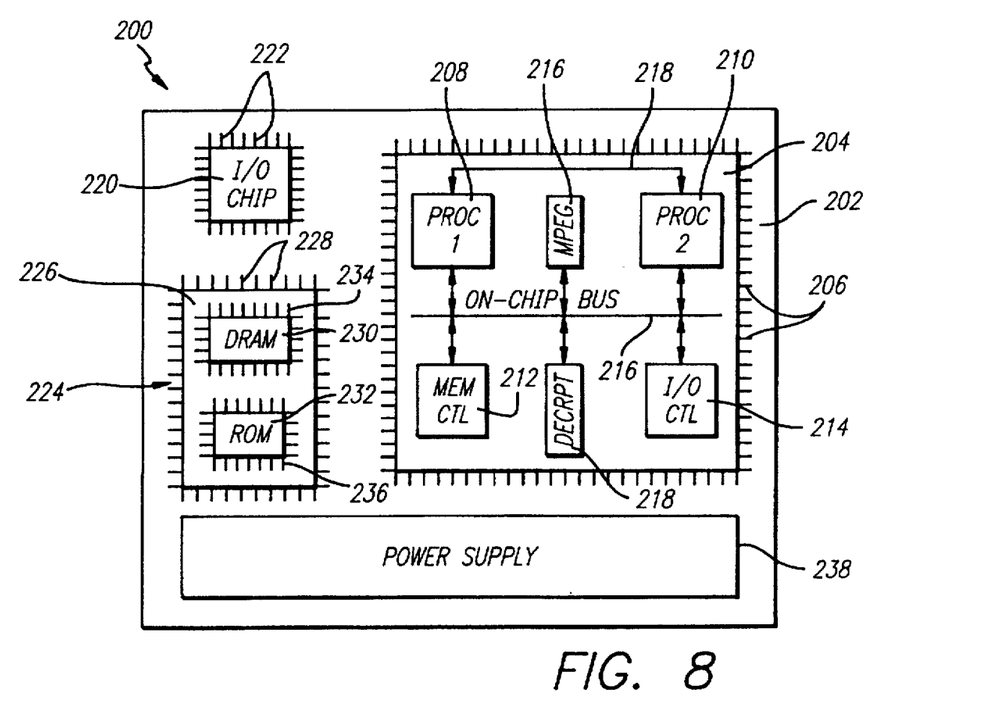
FIG. 8 is a plan view of a board-level-product (BLP) according to the present invention.

FIG. 8 illustrates a BLP 200 according to the present invention. The BLP 200 includes a motherboard or PCB 202 having a metallization pattern formed thereof for required interconnection of chips and modules.

An SCM 204 is mounted on and electrically connected to the metallization pattern on the PCB 202 by leads 206 which may be wire-bonds, flip-chip bumps, pins which fit into conjugate sockets on the PCB 202, etc. The SCM 204 includes first and second processors 208 and 210, a memory control unit 212, and an I/O control unit 214 which are integrated onto the SCM 204 as described above. An MPEG audio/video decoder chip 216 and a decryption chip 218 are also formed on the SCM 204.

The components of the SCM 204 are interconnected by an on-chip bus 216, whereas the processors 208 and 210 are further interconnected by a processor synchronization bus 218.

The BLP 200 further includes an I/O chip 220 having leads 222, and an MCM memory module 224 including a substrate 226 and pins 228. The MCM module 224 further includes a DRAM chip 230 and a ROM chip 232 having pins 234 and 236 respectively.

The BPL 200 yet further includes a power supply 238 which is interconnected via the metallization pattern on the PCB 238 to supply power to the SCM 204, chip 220 and MCM 224.

As with the other embodiments of the invention, the particular illustrated arrangement of the BLP 200 is exemplary only, and should not be construed as limiting the scope of the present invention.

Various modifications will become possible for those skilled in the art after receiving the teachings of the present disclosure without departing from the scope thereof.

For example, the multiprocessor architecture including the processor synchronization bus can be incorporated into a multiprocessor system in which the processors are provided on separate chips. As another modification, different types of processors can be used to run applications in parallel with each other, or can be used selectively depending on a particular application.

We claim:

1. A single-chip multiprocessor system, comprising:
   a first processor;
   a second processor; and
   a processor synchronization bus which interconnects said first and second processors;
   said first processor being adapted, in response to a task more advantageously performed by said second processor, to enable said second processor to perform said task more advantageously performed by said second processor via said processor synchronization bus;
   said second processor being adapted, in response to a task more advantageously performed by said first processor, to enable said first processor to perform said task more advantageously performed by said first processor via said processor synchronization bus.

2. A system as in claim 1, in which the processor synchronization bus comprises:

a first interrupt line which enables the first processor to interrupt the second processor; and a second interrupt line which enables the second processor to interrupt the first processor.

3. A system as in claim 2, in which:

the first processor causes the second processor to perform a task by causing an interrupt to be applied to the second processor over the first interrupt line, and passing parameters required for performing the task to the second processor; and the second processor causes the first processor to perform a task by causing an interrupt to be applied to the first processor over the second interrupt line, and passing parameters required for performing the task to the first processor.

4. A system as in claim 3, further comprising:

a memory controller; and a data transfer bus to which the first and second processors and the memory controller are connected to a memory; in which the first processor passes said parameters to the second processor using the memory controller and the memory; and the second processor passes said parameters to the first processor using the memory controller and the memory.

5. A system as in claim 3, in which:

the processor synchronization bus further comprises a bidirectional data section;

the first processor passes said parameters to the second processor using the bidirectional data section; and the second processor passes said parameters to the first processor using the bidirectional data section.

6. A system as in claim 1, in which the first and second processors are substantially identical.

7. A system as in claim 1, in which the first and second processors are different.

8. A system as in claim 1, in which the first and second processors use a same instruction set.

9. A system as in claim 1, in which the first and second processors use different instruction sets.

10. A system as in claim 9, in which said different instruction sets have different numbers of bits.

11. A single-chip multiprocessor system, comprising:

a first processor;

a second processor;

a processor synchronization bus which interconnects said first and second processors;

a memory controller;

an I/O controller; and a data bus to which said first and second processors, said memory controller and said I/O controller are connected;

said first processor being adapted, in response to a task more advantageously performed by said second processor, to enable said second processor to perform said task more advantageously performed by said second processor via said processor synchronization bus;

said second processor being adapted, in response to a task more advantageously performed by said first processor, to enable said first processor to perform said task more advantageously performed by said first processor via said processor synchronization bus.

12. A system as in claim 11, in which the processor synchronization bus comprises:

a first interrupt line which enables the first processor to interrupt the second processor; and a second interrupt line which enables the second processor to interrupt the first processor.

13. A system as in claim 12, in which:

the first processor causes the second processor to perform a task by causing an interrupt to be applied to the second processor over the first interrupt line, and passing parameters required for performing the task to the second processor; and the second processor causes the first processor to perform a task by causing an interrupt to be applied to the first processor over the second interrupt line, and passing parameters required for performing the task to the first processor.

14. A system as in claim 13, in which:

the first processor passes said parameters to the second processor using the memory controller; and the second processor passes said parameters to the first processor using the memory controller.

15. A system as in claim 13, in which:

the processor synchronization bus comprises a bidirectional data section;

the first processor passes said parameters to the second processor using the bidirectional data section; and the second processor passes said parameters to the first processor using the bidirectional data section.

16. A system as in claim 11, in which the first and second processors are substantially identical.

17. A system as in claim 11, in which the first and second processors are different.

18. A system as in claim 11, in which the first and second processors use a same instruction set.

19. A system as in claim 11, in which the first and second processors use different instruction sets.

20. A system as in claim 19, in which said different instruction sets have different numbers of bits.

21. A system as in claim 11, in which the first and second processors, memory controller and I/O controller are configured as a Single-Chip Module (SCM).

22. A system as in claim 11, in which the first and second processors, memory controller and I/O controller are configured as a Multi-Chip Module (MCM).

23. A system as in claim 11, in which the first and second processors, memory controller and I/O controller are configured as a Board-Level Product (BLP).

24. A system as in claim 11, in which the first and second processors, memory controller and I/O controller are configured as a box-level product.

25. A method of processing data using a multiprocessor system, in which:

the multiprocessor system comprises;

a first processor;

a second processor; and a processor synchronization bus which interconnects said first and second processors and includes a first interrupt line and a second interrupt line said first processor being adapted, in response to a task more advantageously performed by said second processor, to enable said second processor to perform said task more advantageously performed by said second processor via said processor synchronization bus;

said second processor being adapted, in response to a task more advantageously performed by said first processor, to enable said first processor to perform said task more advantageously performed by said first processor via said processor synchronization bus; and the method comprises controlling the first processor to cause the second processor to perform a task, including the steps of:
(a) applying an interrupt to the second processor over the first interrupt line, and
(b) passing parameters required for performing the task to the second processor.

26. A method as in claim 25, in which the method further comprises controlling the second processor to cause the first processor to perform a task, including the steps of:

(c) applying an interrupt to the first processor over the second interrupt line, and
(d) passing parameters required for performing the task to the first processor.

27. A method as in claim 25, in which:
the multiprocessor system further comprises:
a memory; and
a data transfer bus to which the first and second processors and the memory are connected; in which
step (b) comprises passing said parameters to the second processor using the memory.

* * * * *